(12) United States Patent
Nanahara

(10) Patent No.: US 11,428,301 B2
(45) Date of Patent: Aug. 30, 2022

(54) MOTION CONVERSION MECHANISM AND ELECTRIC BRAKE ACTUATOR INCLUDING THE SAME

(71) Applicant: TOYOTA JIDOSHA KABUSHIKI KAISHA, Toyota (JP)

(72) Inventor: Masaki Nanahara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 311 days.

(21) Appl. No.: 16/744,262

(22) Filed: Jan. 16, 2020

(65) Prior Publication Data
US 2020/0263768 A1 Aug. 20, 2020

(30) Foreign Application Priority Data
Feb. 14, 2019 (JP) .............................. JP2019-024627

(51) Int. Cl.
| | |
|---|---|
| *F16H 57/10* | (2006.01) |
| *F16H 25/24* | (2006.01) |
| *B60T 13/02* | (2006.01) |
| *B60T 13/74* | (2006.01) |
| *F16H 25/22* | (2006.01) |

(52) U.S. Cl.
CPC .......... *F16H 25/2454* (2013.01); *B60T 13/02* (2013.01); *B60T 13/746* (2013.01); *F16H 25/2214* (2013.01)

(58) Field of Classification Search
CPC ........... F16D 2125/40; F16D 2125/405; B60T 13/746; B60T 13/02; F16H 25/2006; F16H 25/20
See application file for complete search history.

(56) References Cited

U.S. PATENT DOCUMENTS

| | | | | |
|---|---|---|---|---|
| 1,645,276 A | * | 10/1927 | Burns | F16H 25/2006 74/441 |
| 3,512,447 A | | 5/1970 | Vaughn | |
| 3,765,515 A | * | 10/1973 | Shimada | F16D 65/562 188/79.62 |
| 5,161,648 A | * | 11/1992 | Taig | F16D 55/227 188/196 D |
| 6,053,065 A | * | 4/2000 | Melzer | F16H 25/2006 74/424.94 |
| 6,142,032 A | * | 11/2000 | Creager | F16H 25/2006 74/441 |
| 8,051,729 B2 | * | 11/2011 | Yoshida | F16H 25/2247 74/89.42 |

(Continued)

FOREIGN PATENT DOCUMENTS

| | | |
|---|---|---|
| CN | 102294995 A | 12/2011 |
| CN | 109219544 A | 1/2019 |

(Continued)

*Primary Examiner* — Jake Cook
(74) *Attorney, Agent, or Firm* — Sughrue Mion, PLLC (57) ABSTRACT

A motion conversion mechanism includes a shaft having an external thread and a cylinder having an internal thread that is screwed with the external thread. The motion conversion mechanism converts rotating motion of one of the shaft and the cylinder into linear motion of the other of the shaft and the cylinder. The cylinder is provided with two internal thread portions, each having the internal thread, such that a threadless portion is interposed between the two internal thread portions in an axial direction.

9 Claims, 5 Drawing Sheets

(56) References Cited

U.S. PATENT DOCUMENTS

| | | |
|---|---|---|
| 2013/0019706 A1 | 1/2013 | Cronin et al. |
| 2014/0260748 A1* | 9/2014 | Traver ................ F16H 25/2006 |
| | | 74/441 |
| 2015/0167761 A1 | 6/2015 | Son et al. |
| 2016/0341302 A1 | 11/2016 | Lin et al. |
| 2017/0356514 A1 | 12/2017 | Kim |
| 2017/0370396 A1 | 12/2017 | Kitajima et al. |
| 2019/0249734 A1 | 8/2019 | Sakashita |
| 2020/0256438 A1* | 8/2020 | McAuley ............... G03B 11/06 |

FOREIGN PATENT DOCUMENTS

| | | | |
|---|---|---|---|
| DE | 19 44 805 A1 | 11/1970 | |
| DE | 10 2014 009 098 A1 | 6/2015 | |
| DE | 10 2017 005 483 A1 | 12/2017 | |
| JP | S50-61273 U | 6/1975 | |
| JP | H07-23846 U | 5/1995 | |
| JP | H09-4691 A | 1/1997 | |
| JP | 2009-197958 A | 9/2009 | |
| JP | 2018-003864 A | 1/2018 | |
| WO | WO-2018203003 A1 * | 11/2018 | ............. F16D 51/22 |

\* cited by examiner

MOTION CONVERSION MECHANISM AND ELECTRIC BRAKE ACTUATOR INCLUDING THE SAME

INCORPORATION BY REFERENCE

The disclosure of Japanese Patent Application No. 2019-024627 filed on Feb. 14, 2019 including the specification, drawings and abstract is incorporated herein by reference in its entirety.

BACKGROUND

1. Technical Field

The disclosure relates to a motion conversion mechanism that converts rotating motion into linear motion. The disclosure also relates to an electric brake actuator configured such that the motion conversion mechanism converts rotating motion of the electric motor into advancing-retracting motion of a piston and a friction member is pressed against a rotating body rotating together with a wheel (for example, a brake disc) with the advancement of the piston.

2. Description of Related Art

There are various devices equipped with a motion conversion mechanism that converts rotating motion of one member into linear motion of another member. For example, an electric brake actuator described in Japanese Unexamined Patent Application Publication No. 2009-197958 (JP 2009-197958 A) includes a mechanism that converts rotating motion of an electric motor into linear motion of a piston serving as a linear motion member.

SUMMARY

The electric brake actuator described in JP 2009-197958 A includes a motion conversion mechanism formed of a ball screw mechanism. The ball screw mechanism is relatively expensive. In view of this, adoption of a motion conversion mechanism formed of a screw mechanism that does not use rolling elements is being studied. Such a motion conversion mechanism generally includes a shaft on which an external thread is formed and a cylinder on which an internal thread that is screwed with the external thread is formed. In view of decrease in efficiency and strength due to inclination between the shaft and the cylinder, it is desirable to increase a length of the cylinder. However, in general, the internal thread is formed over the entire length of the cylinder. Therefore, when the length of the cylinder is increased, processing for forming the internal thread becomes relatively difficult. Thus, manufacturing costs of the motion conversion mechanism become high. This leads to an increase in manufacturing cost of an electric brake actuator that includes such a motion conversion mechanism. The disclosure provides a motion conversion mechanism that has relatively high efficiency and high strength and can be achieved at relatively low cost, and by using the motion conversion mechanism, provides an electric brake actuator that has relatively high efficiency and high strength and can be achieved at relatively low cost.

A first aspect of the disclosure relates to a motion conversion mechanism. The motion conversion mechanism includes a shaft having an external thread and a cylinder having an internal thread that is screwed with the external thread. The motion conversion mechanism converts rotating motion of one of the shaft and the cylinder into linear motion of the other of the shaft and the cylinder. The cylinder is provided with two internal thread portions, each having the internal thread, such that a threadless portion having no internal thread is interposed between the two internal thread portions in an axial direction.

In the above aspect, the threadless portion may have a certain length in the axial direction. Specifically, the threadless portion may be longer in axial length than a shorter one, in axial length, of the two internal thread portions.

In the above aspect, when one direction along the axial direction is defined as a first direction and a direction opposite to the first direction is defined as a second direction, a rotational torque and an axial force may act on a portion of the shaft on the first direction side and a portion of the cylinder on the second direction side. In other words, at a portion of the shaft, which projects from the cylinder in one direction (hereinafter, also referred to as "torque/axial force acting portion of the shaft"), a torque for rotating the shaft may be applied and an axial force is received to prohibit movement of the shaft in the axial direction. At an end of the cylinder away from the torque/axial force acting portion of the shaft (hereinafter, also referred to as "torque/axial force acting portion of the cylinder"), a torque for prohibiting the rotation of the cylinder may be received and an axial force may be applied to the outside. Further, at the torque/axial force acting portion of the cylinder, a torque for rotating the cylinder may be applied and an axial force may be received to prohibit movement of the cylinder in the axial direction. At the torque/axial force acting portion of the shaft, a torque for prohibiting the rotation of the shaft may be received and an axial force may be applied to the outside. Hereinafter, such a configuration may be referred to as a "torque/axial force opposite location acting configuration".

When the torque/axial force opposite location acting configuration is adopted, in the above aspect, of the two internal thread portions, the internal thread portion on the first direction side may be longer in axial length than the internal thread portion on the second direction side. The axial force acting between the external thread of the shaft and the internal thread of the cylinder is the highest at an end of the cylinder on the first direction side and decreases from the end toward the second direction side, as will be described later. This is apparent, for example, when the shaft is made thin for the purpose of reducing the size and increasing the efficiency of the motion conversion mechanism. In other words, it can be considered that the internal thread at the portion of the cylinder on the first direction side receives most of the action of the axial force, and the internal thread at the portion of the cylinder on the second direction side only needs to mainly perform a function to suppress relative inclination of the shaft and the cylinder. In view of the above, the number of meshing ridges of the internal thread portion on the first direction side may be relatively large, and the number of meshing ridges of the internal thread portion on the second direction side may be relatively small. In the above aspect, a flange may be provided on an outer periphery of the portion of the cylinder on the second direction side. With this configuration, it is possible to cause the rotational torque to act on the cylinder more effectively.

In the above aspect, the external thread and the internal thread each may be a multi-start thread or a trapezoidal thread. Processing loads of the multi-start thread and the trapezoidal thread are high. When the disclosure is applied to the motion conversion mechanism including the multi-start thread or the trapezoidal thread, the effect of reducing the processing cost will be sufficiently exerted.

A second aspect of the disclosure relates to an electric brake actuator configured to press a friction member against a rotating body that rotates with a vehicle wheel. The electric brake actuator includes a piston that advances to press the friction member toward the rotating body; an electric motor; and the motion conversion mechanism according to the above first aspect, the motion conversion mechanism being configured such that one of the shaft and the cylinder is rotated by the electric motor and the other of the shaft and the cylinder engages with the piston to cause the piston to advance and retract.

In the above aspect, the electric brake actuator may further include a piston inclination permitting mechanism that is provided at a portion where the other of the shaft and the cylinder engages with the piston, and that permits inclination of the piston with respect to the other of the shaft and the cylinder. With the piston inclination permitting mechanism, for example, it is possible to appropriately cope with a radial force acting on the piston due to uneven wear of the friction member or the like. In the above aspect, the piston inclination permitting mechanism may be formed by engaging the other of the shaft and the cylinder with the piston such that a convex spherical face and a concave spherical face come into contact with each other, the convex spherical face provided on one of: the other of the shaft and the cylinder; and the piston, and the concave spherical face provided on the other of: the other of the shaft and the cylinder; and the piston.

Here, the number, in the axial direction, of ridges or roots of the internal thread of the cylinder, which mesh with roots or ridges of the external thread of the shaft, is defined as the number of meshing ridges. In the motion conversion mechanism according to the disclosure, even when the number of meshing ridges is relatively small, it is possible to set an axial distance between two ridges that are most separated in the axial direction, out of the ridges of the internal thread of the cylinder, which mesh with the roots of the external thread of the shaft. Thus, it is possible to make the inclination between the shaft and the cylinder relatively small without increasing the difficulty of processing to form the internal thread of the cylinder. Thus, according to the disclosure, it is possible to provide a motion conversion mechanism that has relatively high efficiency and strength and can be achieved at relatively low processing cost. In addition, according to the disclosure, it is possible to provide an electric brake actuator that has relatively high efficiency and strength and can be achieved at relatively low cost, by adopting the motion conversion mechanism according to the disclosure.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, a motion conversion mechanism and an electric brake actuator that are embodiments of the disclosure will be described in detail with reference to the drawings. Besides the following embodiments, the disclosure can be carried out in various forms in which various modifications and improvements are made based on the knowledge of those skilled in the art.

Electric Brake Device Including Electric Brake Actuator

Figure 1:
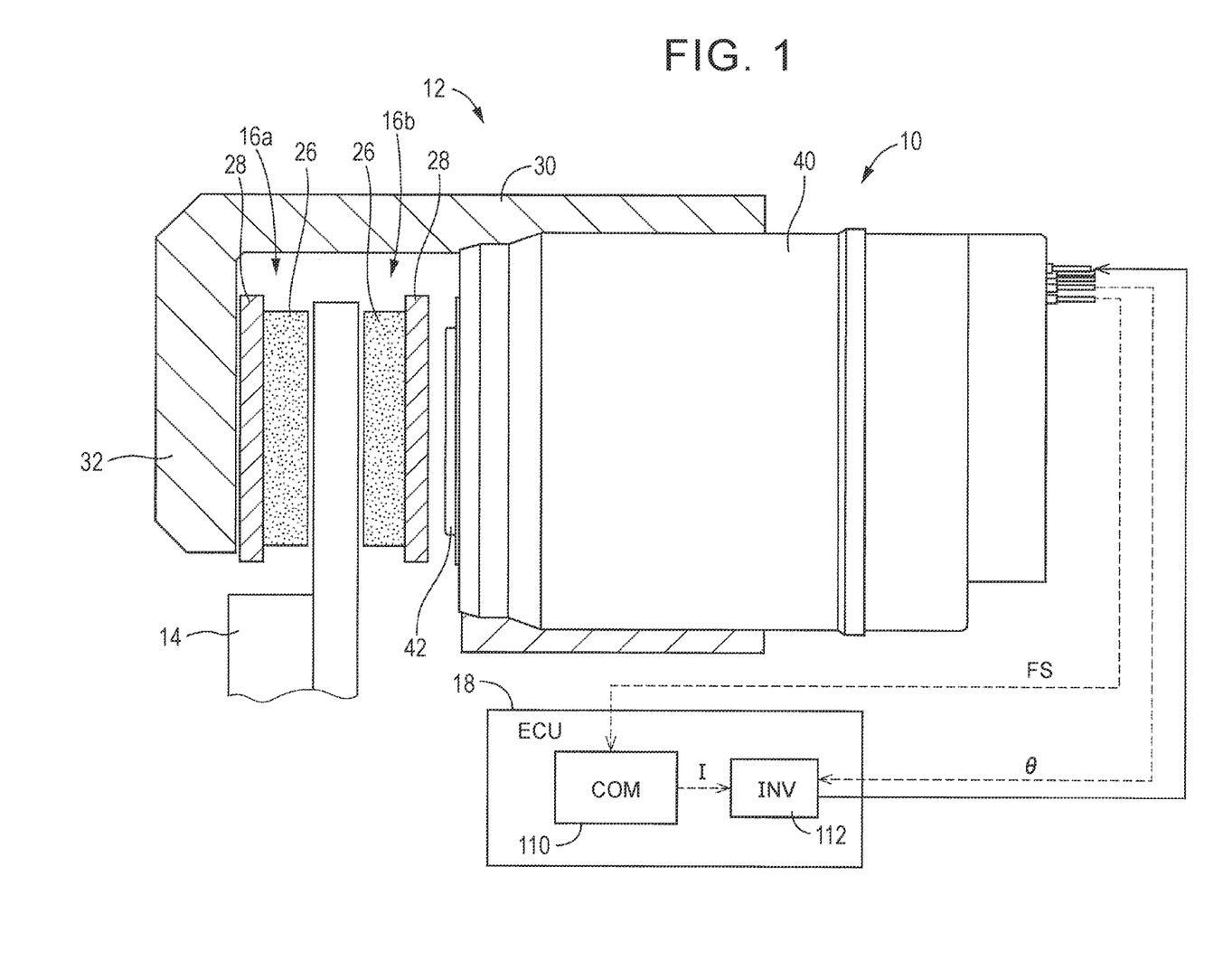
FIG. 1 shows an electric brake device including an electric brake actuator according to an embodiment, the electric brake actuator including a motion conversion mechanism according to the embodiment.

As shown in FIG. 1, an electric brake actuator 10 of the embodiment (hereinafter sometimes simply referred to as "actuator 10") is a main component in an electric brake device. The electric brake device includes a brake caliper 12 (hereinafter sometimes simply referred to as "caliper 12") holding the actuator 10, a disc rotor 14 serving as a rotating body that rotates with a vehicle wheel, a pair of brake pads (hereinafter sometimes simply referred to as "pads") 16a, 16b, and an electronic control unit (hereinafter sometimes referred to as "ECU") 18 serving as a controller.

The caliper 12 is held by a mount (not shown) so as to extend across the disc rotor 14 and to be movable in an axial direction (a right-left direction in FIG. 1). The mount is provided on a carrier (not shown) that holds the wheel so that the wheel is rotatable. The pads 16a, 16b are held by the mount so that the pads 16a, 16b are movable in the axial direction and the disc rotor 14 is sandwiched between the pads 16a and 16b. Each of the pads 16a, 16b includes a friction member 26 on a side thereof to contact the disc rotor 14 and a backup plate 28 supporting the friction member 26. The friction member 26 of each of the pads 16a, 16b is pressed against the disc rotor 14. The pads 16a, 16b themselves may be referred to as friction members.

For convenience, description will be made assuming that the left side in FIG. 1 represents a front side and the right side in FIG. 1 represents a rear side. The front pad 16a is supported by a claw 32 that is a front end part of a caliper body 30. The actuator 10 is held by a rear portion of the caliper body 30 such that a housing 40 of the actuator 10 is fixed thereto. The actuator 10 has a piston 42 that is held by the housing 40 so as to advance and retract. As the piston 42 advances, a tip end, specifically, a front end of the piston 42 engages with the rear pad 16b, specifically, the backup plate 28 of the pad 16b. When the piston 42 in an engaged state further advances, the pair of pads 16a, 16b hold the disc rotor 14. In other words, the friction member 26 of each pad 16a, 16b is pressed against the disc rotor 14. This pressing generates a braking force to the rotation of the wheel, which depends on a frictional force between the disc rotor 14 and the friction members 26, that is, a braking force for decelerating and stopping a vehicle.

Basic Configuration of Electric Brake Actuator

Figure 2:
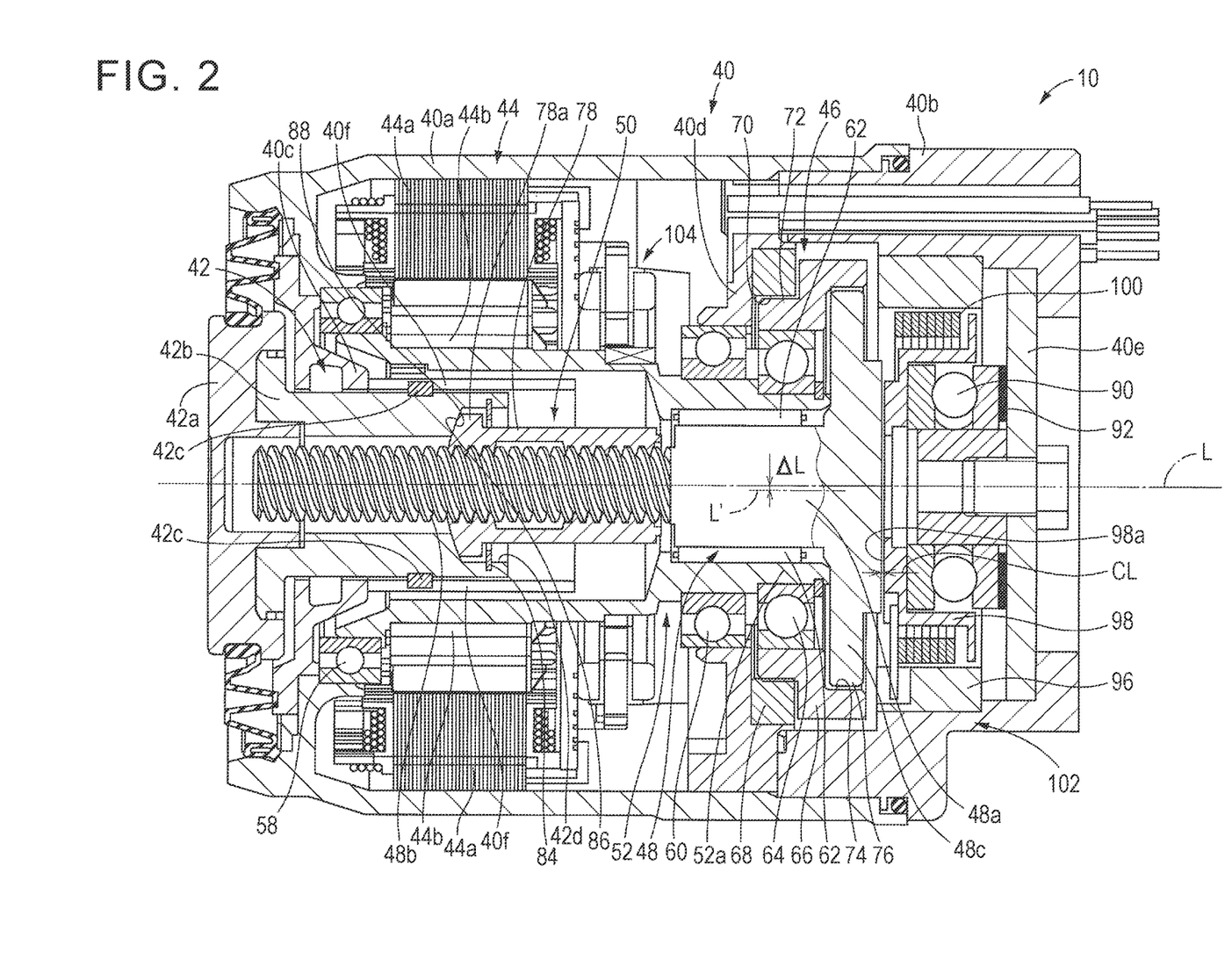
FIG. 2 is a sectional view showing the electric brake actuator according to the embodiment.

As shown in FIG. 2, the actuator 10 according to the embodiment of the disclosure includes, besides the piston 42 and the housing 40 serving as a body of the actuator 10, an electric motor (three-phase direct-current (DC) brushless motor) 44 serving as a drive source, a speed reduction mechanism 46 for decelerating the rotation transmitted from the electric motor 44, a motion conversion mechanism 50, and the like. The motion conversion mechanism 50 has a rotating shaft 48 (an example of a shaft) that rotates with the rotation of the electric motor 44, which is transmitted through the speed reduction mechanism 46. The motion conversion mechanism 50 converts rotating motion of the rotating shaft 48 into advancing-retracting motion (forward and backward motion) of the piston 42. The motion conversion mechanism 50 is a motion conversion mechanism according to the embodiment, and in short, can be considered to convert the rotating motion of the electric motor 44 into the advancing-retracting motion of the piston 42. In the following description, the left side in FIG. 2 will be referred to as the front side, and the right side in FIG. 2 will be referred to as the rear side, for convenience.

Specifically, the housing 40 includes a front case 40a, a rear case 40b, an inner cylinder 40c, a support wall 40d, a support plate 40e, and the like. The front case 40a and the rear case 40b each have a generally cylindrical shape. The inner cylinder 40c has a front end supported by the front case 40a, and the piston 42 is disposed inside the inner cylinder 40c. The support wall 40d having a generally annular shape is disposed inside the front case 40a and supported by a front end of the rear case 40b. The support plate 40e is fixed and held by a rear end of the rear case 40b.

The piston 42 includes a piston head 42a and a hollow piston cylinder 42b. The piston 42 is engaged, at a front end of the piston head 42a serving as the tip end of the piston 42, with the friction member 26 of the brake pad 16b via the backup plate 28. The actuator 10 has a hollow shaft 52 having a cylindrical shape. A front part of the hollow shaft 52 mainly functions as a motor shaft (rotor) that is a rotational drive shaft of the electric motor 44, and a rear part of the hollow shaft 52 mainly functions as an input shaft of the speed reduction mechanism 46 described later in detail. That is, the electric motor 44 can be considered as a type of motor in which a hollow motor shaft rotates. In the following description, the hollow shaft 52 can be considered as a shaft formed by integrating the motor shaft of the electric motor 44 and the input shaft of the speed reduction mechanism 46 rotated by the electric motor 44. In short, the hollow shaft 52 itself can be considered as the input shaft of the speed reduction mechanism 46, or the hollow shaft 52 itself can be considered as the motor shaft of the electric motor 44. The electric motor 44 has coils 44a and magnets 44b. The coils 44a are fixed and held by the front case 40a of the housing 40 so as to be located inside the front case 40a. The magnets 44b are provided on an outer periphery of the front part of the hollow shaft 52 so as to face the coils 44a.

The hollow shaft 52 is disposed such that the inner cylinder 40c is located inside the front part of the hollow shaft 52. The hollow shaft 52 is supported by the housing 40 via two radial ball bearings 58, 60 so as to be rotatable about an axis L that is a central axis of the actuator 10 and so as to be immovable in an axial direction in which the axis L extends. Regarding a positional relationship between the hollow shaft 52 serving as the motor shaft and the piston 42, a rear end of the piston 42 is disposed inside the hollow shaft 52. The inner cylinder 40c has a pair of slots 40f extending in the axial direction, and a pair of keys 42c attached to the piston 42 engage with the pair of slots 40f. Thus, the piston 42 is allowed to move in the axial direction while being prohibited from rotating about the axis L with respect to the housing 40.

The rotating shaft 48 is disposed inside the hollow shaft 52 serving as the motor shaft so as to be coaxial with the hollow shaft 52. The rotating shaft 48 includes three parts integrated together, namely, a shaft portion 48a functioning as an output shaft of the speed reduction mechanism 46, an external thread portion 48b provided on a front side of the shaft portion 48a, and a flange portion 48c provided on a rear end of the shaft portion 48a. The rotating shaft 48 is supported, at the shaft portion 48a thereof, inside the hollow shaft 52 via rollers (also referred to as "needles") 62 so as to be rotatable about the axis L.

The speed reduction mechanism 46 includes a planetary gear body 66 supported by the rear part of the hollow shaft 52 via the radial ball bearing 64 so as to be rotatable but immovable in the axial direction, besides the hollow shaft 52 functioning as the input shaft and the rotating shaft 48 in which the shaft portion 48a functions as the output shaft. A rear end of the hollow shaft 52 (hereinafter sometimes referred to as "eccentric shaft portion 52a"), which supports at its outer periphery the planetary gear body 66 via the radial ball bearing 64, has an axis L' (hereinafter sometimes referred to as "eccentric axis L") defined by the outer peripheral surface. The axis L' is decentered with respect to the axis L by an eccentricity amount ΔL. Thus, the planetary gear body 66 rotates around the eccentric axis L' as well as revolves around the axis L along with rotation of the hollow shaft 52 around the axis L.

Figure 3A:
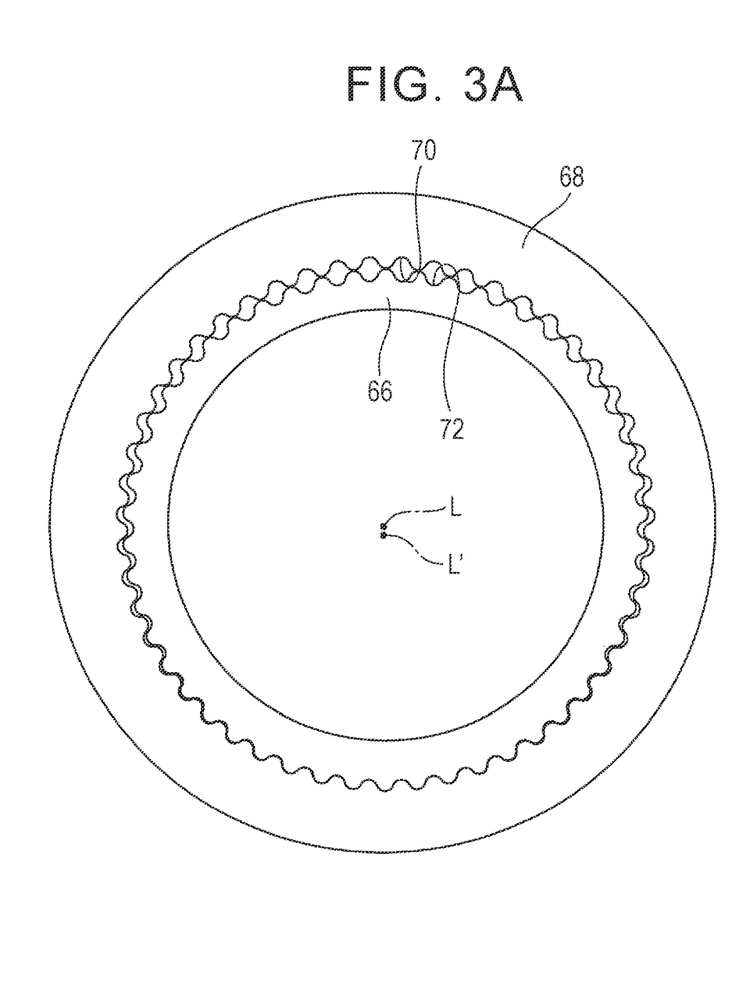
FIG. 3A is a drawing for illustrating a speed reduction mechanism included in the electric brake actuator according to the embodiment.
Figure 3B:
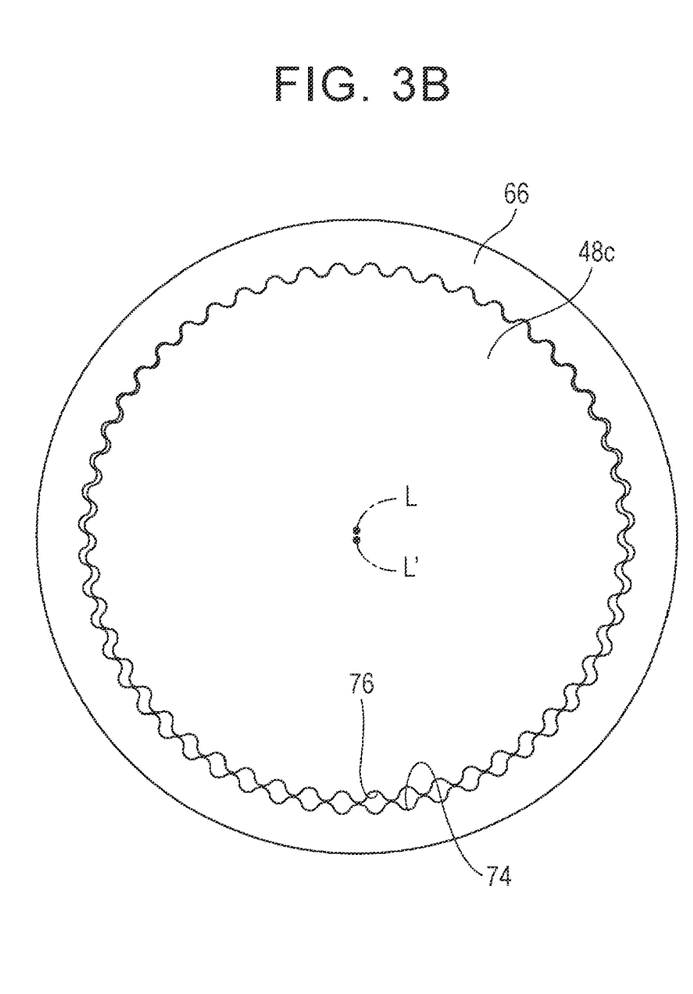
FIG. 3B is a drawing for illustrating the speed reduction mechanism included in the electric brake actuator according to the embodiment.

The speed reduction mechanism 46 further includes a ring gear body 68 fixedly supported by the support wall 40d of the housing 40. As shown in FIG. 3A, the ring gear body 68 has a first internal gear 70, and an outer periphery of the planetary gear body 66 is provided with a first external gear 72, a part of which meshes with a part of the first internal gear 70. Further, as shown in FIG. 3B, a second internal gear 74 is provided on an inner periphery of the planetary gear body 66 so that the first external gear 72 and the second internal gear 74 are arranged side by side in the axial direction. An outer periphery of the flange portion 48c of the rotating shaft 48 is provided with a second external gear 76, a part of which meshes with a part of the second internal gear 74.

The center of the first internal gear 70 is positioned on the axis L, the center of the first external gear 72 is positioned on the eccentric axis L', the center of the second internal gear 74 is positioned on the eccentric axis L', and the center of the second external gear 76 is positioned on the axis L. A meshing point of the first internal gear 70 and the first external gear 72 and a meshing point of the second internal gear 74 and the second external gear 76 are positioned on the opposite sides of the axis L or the eccentric axis L', namely, at positions (phases) offset by 180 degrees from each other in the circumferential direction. That is, the speed reduction mechanism 46 is a differential reduction gear including a first internal planetary gear mechanism and a second internal planetary gear mechanism. The first internal planetary gear mechanism has the first internal gear 70 and the first external gear 72 that contacts the first internal gear 70 from inside to mesh with the first internal gear 70. The second internal planetary gear mechanism has the second internal gear 74 and the second external gear 76 that contacts the second internal gear 74 from inside to mesh with the second internal gear 74.

The first internal gear 70 has an arc-shaped tooth profile, and the first external gear 72 has an epitrochoidal parallel curved tooth profile. Similarly, the second internal gear 74 has an arc-shaped tooth profile, and the second external gear 76 has an epitrochoidal parallel curved tooth profile. Therefore, the speed reduction mechanism 46 is configured as a cycloid reducer (sometimes referred to as "Cyclo (registered trademark) reducer"). Thus, in the speed reduction mechanism 46, the number of teeth of the first internal gear 70 and the number of teeth of the first external gear 72 differ by only one, and the number of teeth of the second internal gear 74 and the number of teeth of the second external gear 76 differ by only one. Thus, the speed reduction mechanism 46 is a speed reduction mechanism with a high reduction ratio, that is, the speed reduction mechanism 46 has a significantly small ratio of the rotation speed of the rotating shaft 48 serving as the output shaft with respect to the rotation speed of the hollow shaft 52 serving as the input shaft, thereby providing a smooth speed reduction.

Figure 4:
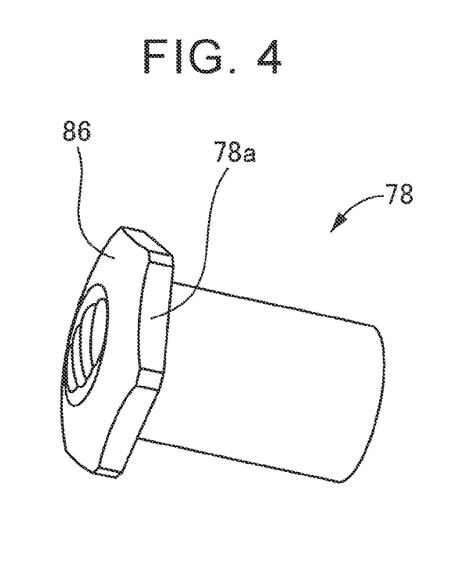
FIG. 4 is a perspective view showing a nut serving as a cylinder included in the motion conversion mechanism according to the embodiment.

As shown in FIG. 2, the motion conversion mechanism 50 includes the rotating shaft 48, more specifically, the external thread portion 48b of the rotating shaft 48, and a nut 78 serving as a cylinder screwed with the external thread portion 48b. The external thread of the external thread portion 48b and the internal thread of the nut 78 are trapezoidal threads and multi-start threads (three-start threads in the actuator 10). A flange 78a is provided on the outer periphery of the front end portion of the nut 78. As shown in FIG. 4, the flange 78a of the nut 78 has a hexagonal outer periphery. The flange 78a is inserted into a bottomed hexagonal hole 42d formed in the rear portion of the piston cylinder 42b of the piston 42 and is prohibited from coming off rearward by the ring 84. As described above, since the rotation of the piston 42 with respect to the housing 40 is prohibited, the rotation of the nut 78 with respect to the housing 40 is also prohibited by engagement of the flange 78a and the bottomed hexagonal hole 42d. The motion conversion mechanism 50 according to the embodiment will be described in detail later.

A front end face 86 of the nut 78, specifically, a front end face of the flange 78a, is in contact with a receiving face 88 serving as a bottom face of the bottomed hexagonal hole 42d of the piston cylinder 42b. An advancing force of the nut 78 is transmitted as an advancing force of the piston 42 via the front end face 86 and the receiving face 88 which are contact faces in contact with each other. The advancing force of the piston 42 functions as a pressing force, with which the piston 42 presses the friction members 26 of the brake pads 16a, 16b against the disc rotor 14.

Figure 5:
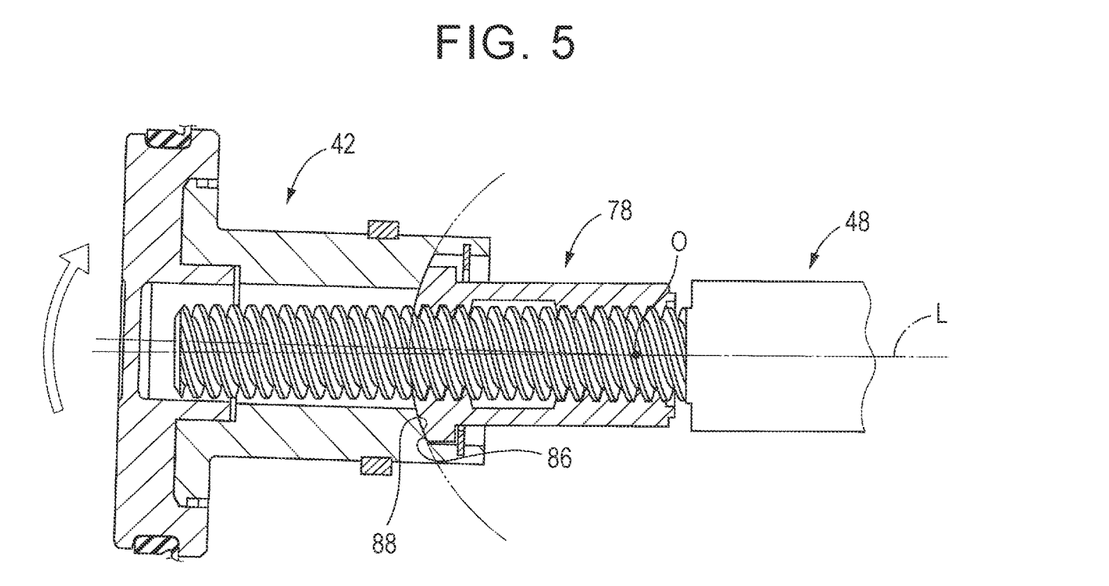
FIG. 5 is a drawing for illustrating a piston inclination permitting mechanism of the electric brake actuator according to the embodiment.

Referring also to FIG. 5, the front end face 86 of the nut 78 and the receiving face 88 of the piston cylinder 42b are configured to closely fit each other, and the front end face 86 and the receiving face 88 form a part of a spherical face centered on a point O on the axis L. Specifically, the front end face 86 of the nut 78 is a convex spherical face, and the receiving face 88 of the piston cylinder 42b is a concave spherical face. Therefore, when a radial force acts on the piston 42 receiving the reaction force of the pressing force, the piston 42 is inclined such that the receiving face 88 slides along the front end face 86 of the nut 78 as shown in FIG. 5. As a mechanism providing such function, the actuator 10 is provided with a piston inclination permitting mechanism including the front end face 86 and the receiving face 88.

The piston 42 may receive a radial force while a braking force is generated, due to uneven wear of the friction members 26, inclination of the disc rotor 14 caused by turning of the vehicle, or the like. In such a case, the piston inclination permitting mechanism permits a smooth inclination of the piston 42, thereby reducing an excessive load or burden on the actuator 10. In the actuator 10, the piston inclination permitting mechanism is formed by engaging the convex spherical face provided on the nut 78 and the concave spherical face provided on the piston 42 so as to contact each other. However, the piston inclination permitting mechanism may be formed by providing the nut 78 with a concave spherical face and providing the piston 42 with a convex spherical face.

The rotating shaft 48 is supported, at the flange portion 48c provided at the rear end of the rotating shaft 48, by the housing 40 via a thrust bearing, specifically, a thrust ball bearing 90. More specifically, a pressing force sensor 92 for detecting the pressing force (axial force) is disposed between the thrust ball bearing 90 and the support plate 40e. The rotating shaft 48 is supported by the support plate 40e of the housing 40 also through the pressing force sensor 92. The pressing force sensor 92 is a so-called load cell, and a detailed structure thereof is omitted in the drawings. More specifically, the actuator 10 includes a retracting torque applying mechanism 102 that includes a stator 96, a rotor 98, and a torsion coil spring 100 that is a torsion spring. The rotor 98 is provided between a thrust ball bearing 90 and the flange portion 48c of the rotating shaft 48. There is a slight clearance CL between the rotor 98 and the flange portion 48c (shown in an exaggerated manner in FIG. 2). When the piston 42 advances and presses the friction members 26 against the disc rotor 14, the rotating shaft 48 is slightly retracted by the reaction force of the pressing force, and the flange portion 48c and a front end face 98a of the rotor 98 come into contact with each other to eliminate the CL. Thus, the rotating shaft 48 is supported by the housing 40 via the thrust ball bearing 90 at the rear end of the rotating shaft 48, that is, at the flange portion 48c.

While the pressing force is acting, the rotating shaft 48 and the rotor 98 rotate together. Although a detailed description is omitted, one end of the torsion coil spring 100 is connected to the stator 96, and the other end is connected to the rotor 98. When the piston 42 is advanced to increase the braking force, the torsion coil spring 100 is further twisted along with the increase. Due to elastic torque of the torsion coil spring 100, a retracting torque that is a torque in a direction in which the piston 42 retracts is applied to the rotating shaft 48. For example, when an electrical failure occurs that inhibits the electric motor 44 from operating while the braking force is being generated, there may be a case depending on the operation of the electric motor 44, in which the piston 42 cannot be retracted and dragging cannot be eliminated. In consideration of this, the actuator 10 is provided with the retracting torque applying mechanism 102.

The actuator 10 includes, in addition to the pressing force sensor 92, a rotation angle sensor 104 for detecting a rotation angle (rotational phase) of the hollow shaft 52 that is the motor shaft. The rotation angle sensor 104 is a resolver.

As shown in FIG. 1, the ECU 18 that is a control device includes a computer 110 having a central processing unit (CPU), a random access memory (RAM), a read-only memory (ROM), and the like, and an inverter 112 serving as a drive circuit (driver) of the electric motor 44. A pressing force FS detected by the pressing force sensor 92 and a rotation angle θ of the hollow shaft 52 detected by the rotation angle sensor 104 are sent to the computer 110 and the inverter 112.

Control of the actuator 10 will be briefly described. The computer 110 determines, for example, a necessary braking force that is a braking force to be generated by the electric brake device, in accordance with the degree of operation of a brake operation member such as a brake pedal. Based on the necessary braking force, the computer 110 determines a target pressing force that is a target of the pressing force FS.

Then, the computer 110 determines a target supply current that is a current I to be supplied to the electric motor 44 so that the detected pressing force FS matches the target pressing force. In accordance with the target supply current, the inverter 112 controls the electric motor 44 based on the detected rotation angle θ.

Motion Conversion Mechanism

As described above, the actuator 10 includes the motion conversion mechanism 50 that has the rotating shaft 48 serving as the shaft having the external thread and the nut 78 serving as the cylinder having the internal thread that is screwed with the external thread, and that converts rotating motion of the rotating shaft 48 into linear motion of the nut 78.

Figure 6:
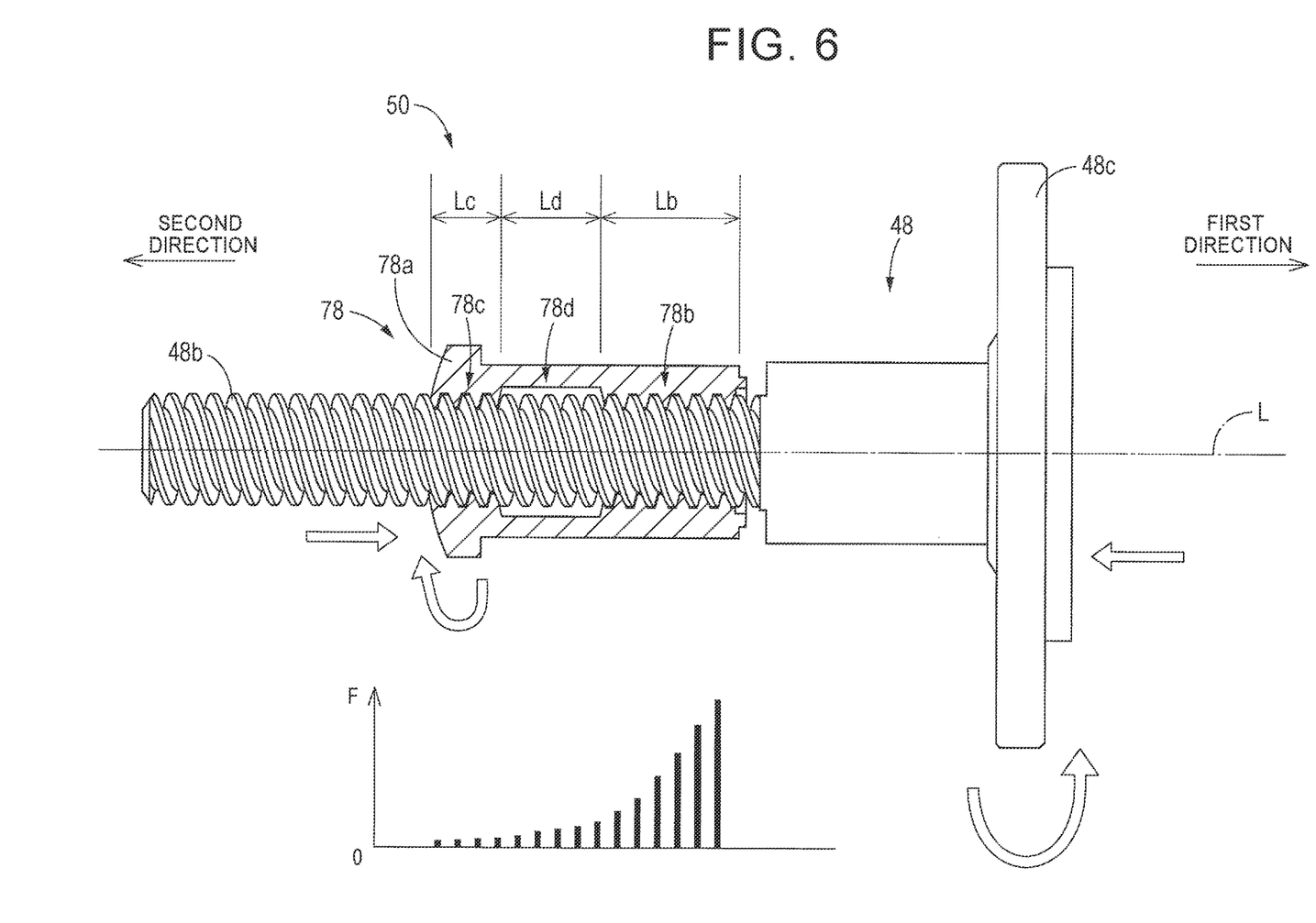
FIG. 6 is a partial sectional view illustrating the motion conversion mechanism according to the embodiment.

Referring to FIG. 6, in the motion conversion mechanism 50, the internal thread is formed in the nut 78 at two portions spaced apart from each other in the axial direction. When a rear portion of the nut 78, that is, a portion including an end at which the flange 78a is not formed is referred to as a first internal thread portion 78b, and a front portion of the nut 78, that is, a portion including an end at which the flange 78a is formed is referred to as a second internal thread portion 78c, the first internal thread portion 78b and the second internal thread portion 78c are provided such that a threadless portion 78d with no internal thread is interposed therebetween in the axial direction.

Here, a rearward direction is defined as a first direction that is one direction along the axial direction, and a forward direction is defined as a second direction that is opposite to the first direction, as shown in FIG. 6. In the motion conversion mechanism 50, as indicated by white arrows in FIG. 6, a rotational torque for rotating the rotating shaft 48 acts on the flange portion 48c, which is the portion of the rotating shaft 48 on the first direction side, and the axial force that is a counteracting force from the support plate 40e of the housing 40 with respect to the reaction force of the pressing force also acts on the flange portion 48c. At the flange 78a that is the portion of the nut 78 on the second direction side, a rotational torque for inhibiting the rotation of the nut 78 and the reaction force of the pressing force act. That is, the flange portion 48c functions as a torque/axial force acting portion of the rotating shaft 48, and the flange 78a functions as a torque/axial force acting portion of the nut 78. The flange portion 48c is located on the first direction side of the rotating shaft 48, and the flange 78a is located on the second direction side of the nut 78. Thus, the motion conversion mechanism 50 adopts a torque/axial force opposite location acting configuration.

In consideration of reduction in efficiency, strength, etc. of the motion conversion mechanism 50 due to inclination between the rotating shaft 48 and the nut 78, more specifically, relative inclination between respective axes of the rotating shaft 48 and the nut 78, a length of the nut 78 in the axial direction (hereinafter sometimes referred to as "axial length") is desirably long in order to reduce the inclination. Here, assume that the internal thread is provided over the entire axial length of the nut like a general nut. When the axial length is increased, the number of ridges of the internal thread (the number of ridges in the axial direction) increases, so that processing to form the internal thread is relatively difficult. Since the motion conversion mechanism 50 adopts the trapezoidal threads and the multi-start threads, processing load is large and the processing is considerably difficult.

In view of the foregoing, the motion conversion mechanism 50 includes the nut 78 having the two internal thread portions, namely, the first internal thread portion 78b and the second internal thread portion 78c with the threadless portion 78d interposed therebetween. Thus, the number of ridges to be formed is considerably small, and the processing to form the internal thread can be performed relatively easily. The axial length of the nut 78 is long, that is, a distance between an end of the internal thread on the first direction side and an end of the internal thread on the second direction side that mesh with the external thread of the rotating shaft 48 is large. Therefore, the inclination between the nut 78 and the rotating shaft 48 is suppressed. In other words, the motion conversion mechanism 50 is a mechanism that has relatively high efficiency and strength and can be achieved at relatively low cost, and therefore, the actuator 10 including the motion conversion mechanism 50 is an actuator that has relatively high efficiency and strength and can be achieved at relatively low cost.

When the number, in the axial direction, of ridges or roots of the internal thread of the nut 78, which mesh with roots or ridges of the external thread of the rotating shaft 48, is defined as the number of meshing ridges, the number of meshing ridges of the first internal thread portion 78b is generally "6", and the number of meshing ridges of the second internal thread portion 78c is generally "3", specifically shown in FIG. 6. Further, the threadless portion 78d has such an axial length that the number of meshing ridges is generally "4". That is, when the axial lengths of the first internal thread portion 78b, the second internal thread portion 78c, and the threadless portion 78d are Lb, Lc, and Ld, respectively, as shown in FIG. 6, Lb>Ld>Lc is satisfied in the motion conversion mechanism 50.

Assuming that the internal thread is formed over the entire axial length of the nut 78, an axial force F that acts on each ridge is as shown in a graph in FIG. 6 when the rotational torque and the axial force act as shown in FIG. 6. Specifically, since a diameter of the external thread portion 48b of the rotating shaft 48 is relatively small, that is, torsional rigidity of the rotating shaft 48 is relatively low, the axial force F is the largest on the ridge of the internal thread at the first direction end. The axial force F acting on the ridge gradually decreases toward the second direction side. In short, the axial force acting on the nut 78 is mainly received by the ridges on the first direction side and hardly received by the ridges on the second direction side. Based on such distribution of the axial force, the axial length Lb of the first internal thread portion 78b on the first direction side is made long. In other words, the axial length Lc of the second internal thread portion 78c on the second direction side is kept to a length sufficient to suppress the inclination between the rotating shaft 48 and the nut 78.

The motion conversion mechanism 50 of the embodiment has been described above. The electric brake actuator may be configured such that the nut having the internal thread is rotated by an electric motor, and the shaft having the external thread advances and retracts so that the piston presses the friction members against the disc rotor. In that case, a motion conversion mechanism that converts the rotating motion of the nut into the linear motion of the shaft may be adopted. When such an electric brake actuator includes the piston inclination permitting mechanism, a mechanism that permits inclination of the piston with respect to the shaft may be employed.

What is claimed is:

1. A motion conversion mechanism comprising:
    a shaft having an external thread; and
    a cylinder having an internal thread that is screwed with the external thread, wherein the motion conversion mechanism converts rotating motion of one of the shaft and the cylinder into linear motion of the other of the shaft and the cylinder, and wherein the cylinder is provided with two internal thread portions, each having the internal thread, such that a threadless portion having no internal thread is interposed between the two internal thread portions in an axial direction, wherein the threadless portion is longer in axial length than a shorter one, in axial length, of the two internal thread portions.

2. The motion conversion mechanism according to claim 1, wherein when one direction along the axial direction is defined as a first direction and a direction opposite to the first direction is defined as a second direction, a rotational torque and an axial force act on a portion of the shaft on the first direction side and a portion of the cylinder on the second direction side.

3. The motion conversion mechanism according to claim 2, wherein, of the two internal thread portions, the internal thread portion on the first direction side is longer in axial length than the internal thread portion on the second direction side.

4. The motion conversion mechanism according to claim 2, wherein a flange is provided on an outer periphery of the portion of the cylinder on the second direction side.

5. The motion conversion mechanism according to claim 1, wherein the external thread and the internal thread are each a multi-start thread.

6. The motion conversion mechanism according to claim 1, wherein the external thread and the internal thread are each a trapezoidal thread.

7. An electric brake actuator configured to press a friction member against a rotating body that rotates with a vehicle wheel, the electric brake actuator comprising:
    a piston that advances to press the friction member toward the rotating body;
    an electric motor; and
    the motion conversion mechanism according to claim 1, the motion conversion mechanism being configured such that one of the shaft and the cylinder is rotated by the electric motor and the other of the shaft and the cylinder engages with the piston to cause the piston to advance and retract.

8. The electric brake actuator according to claim 7, further comprising a piston inclination permitting mechanism that is provided at a portion where the other of the shaft and the cylinder engages with the piston, and that permits inclination of the piston with respect to the other of the shaft and the cylinder.

9. The electric brake actuator according to claim 8, wherein the piston inclination permitting mechanism is formed by engaging the other of the shaft and the cylinder with the piston such that a convex spherical face and a concave spherical face come into contact with each other, the convex spherical face provided on one of: the other of the shaft and the cylinder; and the piston, and the concave spherical face provided on the other of: the other of the shaft and the cylinder; and the piston.

* * * * *